2,960,497
Patented Nov. 15, 1960

2,960,497

TETRAKISAZO DYESTUFFS

Ernst Messmer, Leverkusen, Germany, assignor to Farbenfabriken Bayer Aktiengesellschaft, Leverkusen, Germany, a corporation of Germany No Drawing. Filed Aug. 3, 1959, Ser. No. 831,058

Claims priority, application Germany Aug. 12, 1958

1 Claim. (Cl. 260—157)

The present invention is directed to new metallizable azo dyestuffs; more particularly it relates to tetrakisazo dyestuffs of the formula

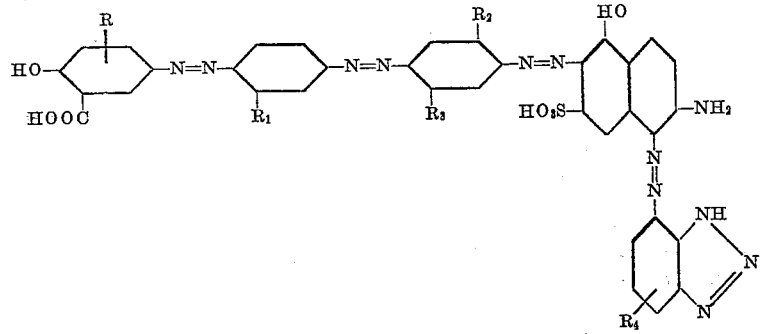

In this formula R means hydrogen or a methyl group, $R_1$ stands for hydrogen or a sulfonic acid group, $R_2$ denotes a methoxy or a carboxylic acid group, $R_3$ means hydrogen, methyl or methoxy and $R_4$ stands for hydrogen or methyl, with the provision that $R_2$ is methoxy when $R_1$ stands for a sulfonic acid group.

The new metallizable tetrakisazo dyestuffs can be conveniently prepared by diazotizing 4-aminobenztriazole which may be substituted in the benzene nucleus by a methyl group, coupling with 2-amino-5-hydroxynaphthalene-7-sulfonic acid in an acid medium and subsequently reacting the monoazo compound thus obtained in an alkaline medium with the diazo compound of an amino-disazo compound having the formula

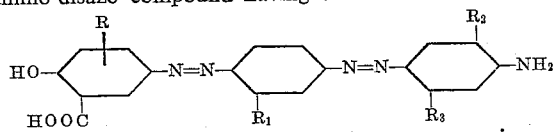

wherein R, $R_1$, $R_2$ and $R_3$ have the same meaning as indicated above.

The amino-disazo compound used for coupling in the alkaline range is obtained in various ways depending on the substitution, for example by diazotizing 1-nitro-4-aminobenzene-3-sulfonic acid, coupling with salicylic acid which may be substituted by a methyl group, reducing in the nitromonoazo dyestuff the nitro group to the amino group, diazotizing again, and coupling with 1-amino-2,5-dialkoxybenzene or 1-amino-2-alkoxy-5-alkylbenzene in the p-position to the amino group.

Amino-disazo compounds of the above mentioned type which in the o-position to the diazotizable amino group contain a carboxylic acid group instead of the alkoxy substituent, can be produced by the process of U.S. patent specification No. 2,109,183 by condensing the nitromonoazo dyestuff obtainable according to the process described above and having the formula

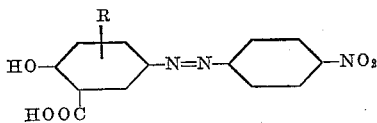

wherein R means hydrogen or a methyl group with 2,5-diaminobenzene-1-carboxylic acid in a sodium-alkaline medium with the formation of a second azo grouping.

The new dyestuffs are excellently suitable for the dyeing of cotton and regenerated cellulose and yield on these materials preponderantly black dyeings of very good fastness properties, particularly a very good fastness to wetting and light.

The following examples are given for the purpose of illustrating the invention.

Example 1

38.1 parts by weight of the disodium salt of 4-amino-4'-hydroxy-3'-carboxybenzene-azo-(1,1') - benzene-2-sulfonic acid are dissolved in about 300 parts by volume of water and diazotized indirectly in hydrochloric acid at about 15° C. with 6.9 parts by weight of sodium nitrite. Into the pale brownish yellow suspension of the diazo compound there is stirred with the simultaneous addition of ice a hydrochloric acid solution of 14 parts by weight of 3-amino-4-methoxy-1-methylbenzene, and the mixture is kept just neutral to Congo by the addition of sodium acetate. After completion of the coupling, the disazo dyestuff thus formed is isolated alkaline.

In a separate mixture 17 parts by weight of the hydrochloride of 4-aminobenztriazole are dissolved in about 200 parts by volume of water and treated with good stirring in rapid sequence with ice, 45 parts of concentrated hydrochloric acid and a concentrated solution of 6.9 parts by weight of sodium nitrite.

The diazo solution thus obtained, kept cold and, if necessary, filtered, is buffered with 23 parts by weight of sodium acetate and gradually treated with a weakly acetic acid solution of 26 parts by weight of the sodium salt of 2-amino-5-hydroxynaphthalene-7-sulfonic acid in about 200 parts by volume of water. Coupling proceeds fairly rapidly, even while the mixture still shows a marked acid reaction to Congo. The red monoazo dyestuff thus formed is precipitated soda-alkaline with sodium chloride and isolated.

The disazo dyestuff obtained by the process described above is dissolved as highly concentrated as possible in hot water and the solution is filtered through animal charcoal. In the filtrate which after cooling is a copper-colored suspension, the aminodisazo compound is diazotized with 6.9 parts by weight of sodium nitrite and the requisite amount of hydrochloric acid at about 15° C., whereupon the color turns via black to brown. The paste of the red monoazo dyestuff is dissolved with 30 parts by weight of sodium carbonate, 125 parts by weight of pyridine and about 150 parts by volume of water; the solution is stirred with the brown diazo suspension while cooling with ice. The deep black colored mixture which forms a thick paste becomes more thinly liquid after prolonged stirring. For isolation of the tetrakisazo dyestuff, the mixture is heated to 70–80° C. and stirred with about 7.5 percent of sodium chloride. The dyestuff filtered off with suction from the liquor is black, dissolves in water with a blue, in concentrated sulfuric acid with a greenish grey color; the after-coppered dyeing on cotton is greyish blue to deep blue-black, depending on the intensity, and is distinguished by a very good fastness to light and wetting.

Dyestuffs of similar dyeing properties are obtainable by the same method when using 39.5 parts by weight of the disodium salt of 4-amino-4'-hydroxy-3'-carboxy-5'- or -6'-methylazo-(1,1')-benzene-2-sulfonic acid instead of 38.1 parts by weight of the above mentioned starting component, or 18.4 parts by weight of 4-amino-7-methylbenztriazole hydrochloride instead of 17 parts by weight of 4-aminobenztriazole hydrochloride.

If instead of the 14 parts by weight of 3-amino-4-methoxy-1-methylbenzene 16 parts by weight of 2-amino-1,4-dimethoxybenzene are applied in the procedure described in the first paragraph of this example, a dyestuff is obtained which dissolves in water with a clear blue, in concentrated sulfuric acid with a greyish blue color. The after-coppered dyeing on cotton is greyish blue to blue-black showing a somewhat greener shade.

*Example 2*

44.9 parts by weight of the disodium salt of the disazo dyestuff 4-amino-3-carboxybenzene-azo-(1,4') - benzene-azo-(1',1'')-4''-hydroxybenzene-3''-carboxylic acid, obtainable by sodium-alkaline condensation of 4-nitro-4'-hydroxyazo-benzene-3'-carboxylic acid with 2,5-diamino-benzene-carboxylic acid, are stirred in about 300 parts by volume of water and diazotized indirectly in hydrochloric acid with 6.9 parts by weight of sodium nitrite below 20° C. The diazo compound is combined in the same manner as described in Example 1 with the monoazo dyestuff obtained by acid coupling of diazotized 4-aminobenztriazole with 2-amino-5-hydroxynaphthalene-7-sulfonic acid. The isolated tetrakisazo dyestuff is a black powder and dissolves in water with a violetish gray, in concentrated sulfuric acid with a clear greenish blue color. The after-coppered dyeing on cotton is bluish black and very fast to light and wetting.

I claim:

A metallizable tetrakisazo dyestuff of the formula

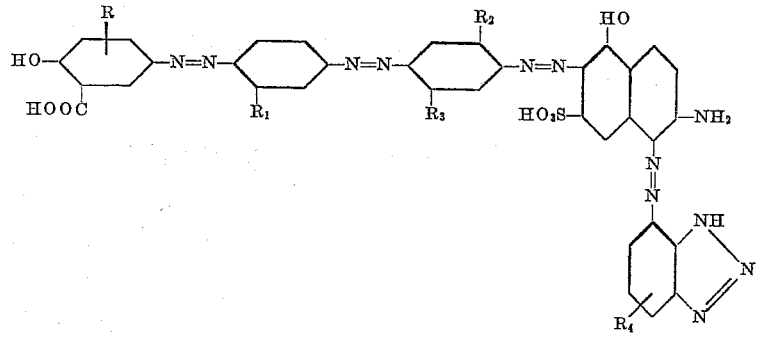

wherein R stands for a radical selected from the group consisting of hydrogen and methyl, $R_1$ means a member selected from the group consisting of hydrogen and a sulfonic acid group, $R_2$ stands for a member selected from the group consisting of methoxy and a carboxylic acid group, $R_2$ being methoxy when $R_1$ stands for a sulfonic acid group, $R_3$ means a substituent selected from the group consisting of hydrogen, methyl and methoxy, and $R_4$ stands for a radical selected from the group consisting of hydrogen and methyl.

No references cited.